United States Patent
Caldirola

(10) Patent No.: US 7,886,859 B2
(45) Date of Patent: Feb. 15, 2011

(54) HIGH-PERFORMANCE CAR WITH STREAMLINE CONFIGURATION-ALTERING AIR JETS

(75) Inventor: Luca Caldirola, Legnano (IT)

(73) Assignee: Ferrari S.p.A., Modena (IT)

( * ) Notice: Subject to any disclaimer, the term of this patent is extended or adjusted under 35 U.S.C. 154(b) by 471 days.

(21) Appl. No.: 11/988,461

(22) PCT Filed: Jul. 6, 2006

(86) PCT No.: PCT/IB2006/001953

§ 371 (c)(1),
(2), (4) Date: Jan. 7, 2008

(87) PCT Pub. No.: WO2007/007184

PCT Pub. Date: Jan. 18, 2007

(65) Prior Publication Data

US 2009/0140543 A1   Jun. 4, 2009

(30) Foreign Application Priority Data

Jul. 8, 2005   (IT)   .......................... BO2005A0457

(51) Int. Cl.
  *B60K 11/00*   (2006.01)
  *B60K 11/08*   (2006.01)
  *F16D 65/78*   (2006.01)
  *F01P 7/02*   (2006.01)

(52) U.S. Cl. .................... 180/68.2; 180/68.3; 180/68.4; 165/44; 188/71.6; 188/264 AA; 123/41.59

(58) Field of Classification Search ................ 180/68.1, 180/68.2, 68.3, 68.4, 69.1; 296/180.1; 165/44; 123/41.58, 41.59, 41.56; 188/71.6, 264 AA See application file for complete search history.

(56) References Cited

U.S. PATENT DOCUMENTS

| | | | | | |
|---|---|---|---|---|---|
| 1,979,191 | A | * | 10/1934 | Burney | ...................... 180/68.1 |
| 2,358,663 | A | * | 9/1944 | Scott-Iversen | ............. 180/68.2 |
| 2,393,899 | A | * | 1/1946 | Gregory | ................... 123/41.66 |

(Continued)

FOREIGN PATENT DOCUMENTS

DE   19633205   2/1998

(Continued)

OTHER PUBLICATIONS

PCT/IB2006/001953 Search Report; Oct. 6, 2006.

*Primary Examiner*—J. Allen Shriver, II
*Assistant Examiner*—John R Olszewski
(74) *Attorney, Agent, or Firm*—Kevin D. Jablonski; Graybeal Jackson LLP

(57) ABSTRACT

An embodiment of a high-performance car having a car body; at least one member for cooling; at least one cooling duct extending between an inlet opening and an outlet opening, both formed through the car body, to conduct outside cooling air through the member for cooling; and at least one blow duct which terminates at a blow opening, formed through the car body, to direct an air jet which interacts with the airflow about the car body to alter the streamline configuration of the car; the blow duct originates at an initial portion of the cooling duct, upstream from the member for cooling, and has a deflecting device which can be activated to divert at least part of the air in the cooling duct to the blow duct.

21 Claims, 7 Drawing Sheets

U.S. PATENT DOCUMENTS

| | | | |
|---|---|---|---|
| 2,886,120 A * | 5/1959 | Broell | 180/68.1 |
| 4,460,055 A | 7/1984 | Steiner | |
| 4,673,206 A | 6/1987 | Kretschmer et al. | |
| 4,690,204 A * | 9/1987 | Reichel et al. | 165/44 |
| 4,772,299 A * | 9/1988 | Bogusz | 55/385.3 |
| 5,407,245 A | 4/1995 | Geropp | |
| 5,842,734 A | 12/1998 | Lechner | |
| 5,863,090 A | 1/1999 | Englar | |
| 5,908,217 A | 6/1999 | Englar | |
| 6,033,010 A | 3/2000 | Preiss | |
| 6,302,228 B1 * | 10/2001 | Cottereau et al. | 180/68.1 |
| 2003/0183432 A1 * | 10/2003 | Suzuki | 180/68.1 |
| 2005/0029027 A1 * | 2/2005 | Kunikata et al. | 180/68.1 |

FOREIGN PATENT DOCUMENTS

| | | |
|---|---|---|
| EP | 0175939 | 4/1996 |
| EP | 1348845 A2 | 10/2003 |
| FR | 2679861 A1 * | 2/1993 |
| JP | 05169981 A * | 7/1993 |

* cited by examiner

HIGH-PERFORMANCE CAR WITH STREAMLINE CONFIGURATION-ALTERING AIR JETS

This is a continuation-in-part application which claims priority from PCT/IB2006/001953, published in English, filed Jul. 6, 2006, based on Italian patent Application No. BO2005A000457, filed Jul. 8, 2005, which is incorporated herein by reference.

TECHNICAL FIELD

An embodiment of the present invention relates to a high-performance car with streamline configuration-altering air jets to reduce drag and/or control road-holding and balance of the car.

BACKGROUND

Streamlining of high-performance cars at times poses conflicting requirements: high-speed cornering requires a negative-lift aerodynamic force on the car body to increase the vertical load and hence the cornering force of the tires, which, however, is accompanied by drag which limits the maximum speed achievable. Good road-holding and low drag can be achieved using adjustable streamlining surfaces, which change shape as a function of the speed of the car. More specifically, at very high speeds, never encountered when cornering, they are positioned to minimize drag, whereas, at lower speeds, they are positioned to maximize negative lift and so achieve maximum road-holding performance.

Adjustable streamlining surfaces, however, may pose numerous drawbacks: to be effective, they often must be fairly large, which normally conflicts with aesthetic requirements; they may require a mechanically strong, and therefore heavy, high-cost, support and actuating system to withstand aerodynamic stress; and, finally, being exposed to weather, they may call for fairly frequent maintenance to ensure consistent performance.

To alter the streamline configuration of a car at high speed, it has also been proposed to use air jets which interact with the airflow about the car. In other words, by blowing air through the car body, it is possible to interact with the airflow about the car to reduce the form drag component and so alter the streamline configuration of the car as a function of operating conditions, without actually altering the external shape of the car.

Examples of high-performance cars with high-speed streamline configuration-altering air jets are described in U.S. Pat. No. 5,863,090A1, U.S. Pat. No. 5,842,734A1, U.S. Pat. No. 5,908,217A1, U.S. Pat. No. 5,407,245A1, U.S. Pat. No. 6,033,010A1 and DE19633205A1, which are incorporated by reference.

Known air jet systems, for altering the streamline configuration of a car at high speed, however, may be bulky and heavy, and so increase weight—often a serious drawback in the case of high-performance cars—and may reduce the space available inside. Moreover, power consumption by the air fans employed is typically far from negligible, and is subtracted from the drive wheels. And finally, electric fans may call for oversizing the alternator on the car, thus further increasing overall weight.

SUMMARY

An embodiment of the present invention is a high-performance car with streamline configuration-altering air jets, which is cheap and easy to produce and, at the same time, provides for eliminating the aforementioned drawbacks.

BRIEF DESCRIPTION OF THE DRAWINGS

One or more non-limiting embodiments of the present invention will be described by way of example with reference to the accompanying drawings, in which.

DETAILED DESCRIPTION

Figure 1:
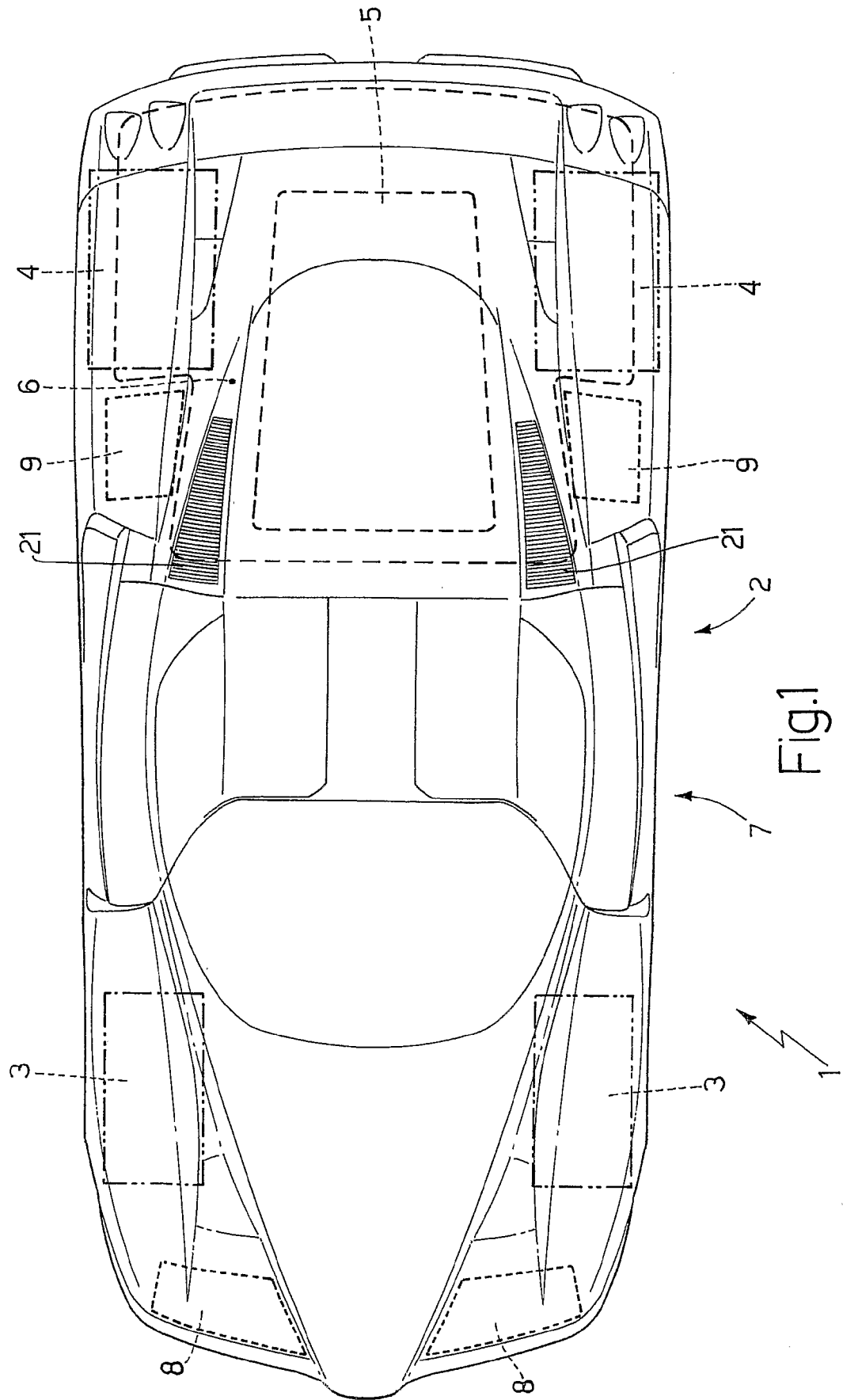
FIG. 1 shows a schematic plan view of a high-performance car in accordance with an embodiment of the present invention.

Number 1 in FIG. 1 indicates a car marketed by Ferrari S.p.A. by the name "Enzo", and comprising a car body 2; two front driven wheels 3; two rear drive wheels 4; and an internal combustion engine 5 housed centrally in an engine compartment 6 adjacent to a passenger compartment 7.

Engine 5 has a cooling circuit comprising two front radiators 8 close to the nose of car 1, and two rear radiators 9 on opposite sides of engine compartment 6.

Figure 2:
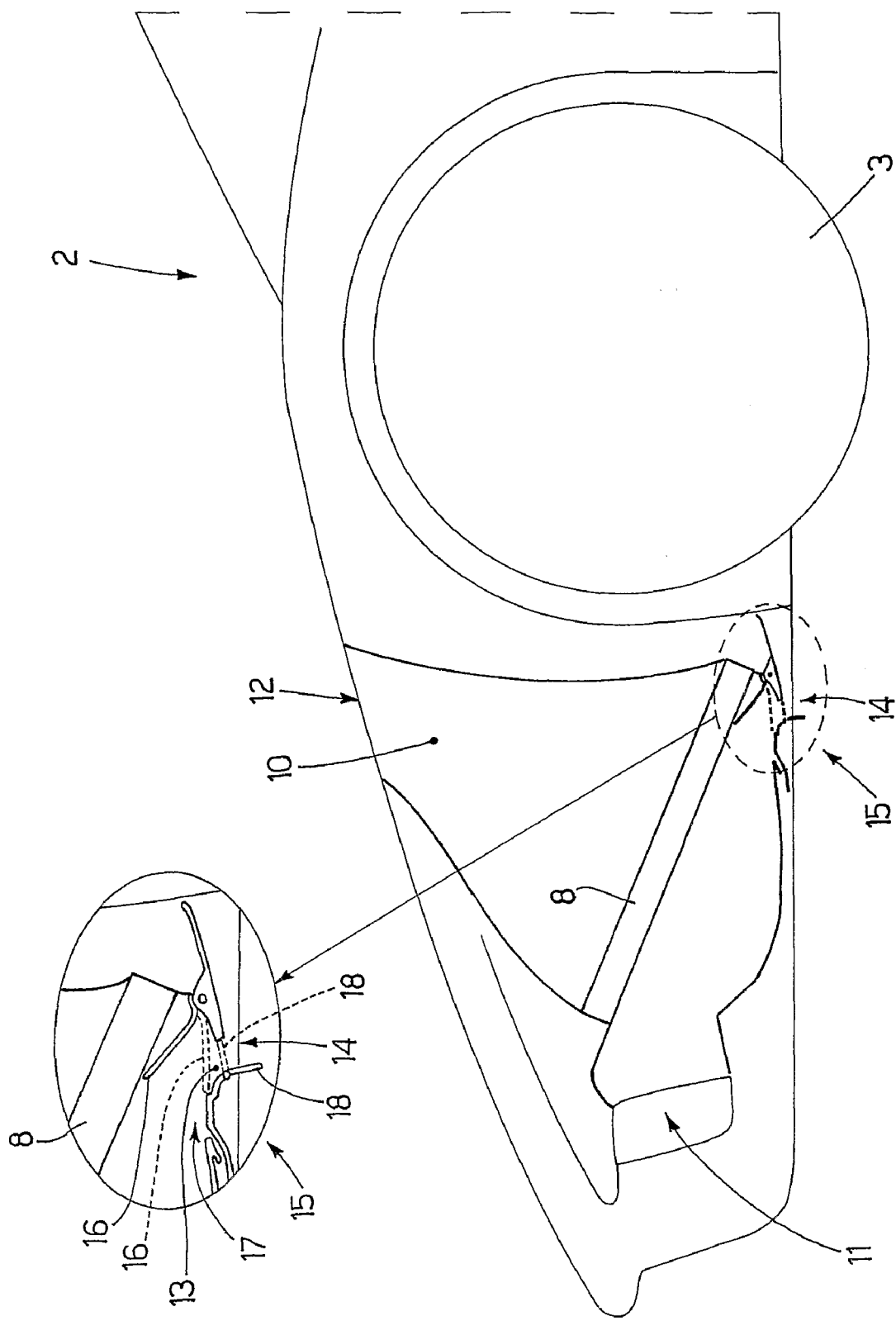
FIG. 2 shows a partly sectioned side view, with parts removed for clarity, of a front portion of the FIG. 1 car.

As shown in FIG. 2, each front radiator 8 is located along a cooling duct 10 which, in use, conducts outside cooling air through front radiator 8 to cool it. Each cooling duct 10 extends between a substantially vertical inlet opening 11 formed through a front bumper of car body 2, and a substantially horizontal outlet opening 12 formed through a front boot lid of car body 2.

Figure 3:
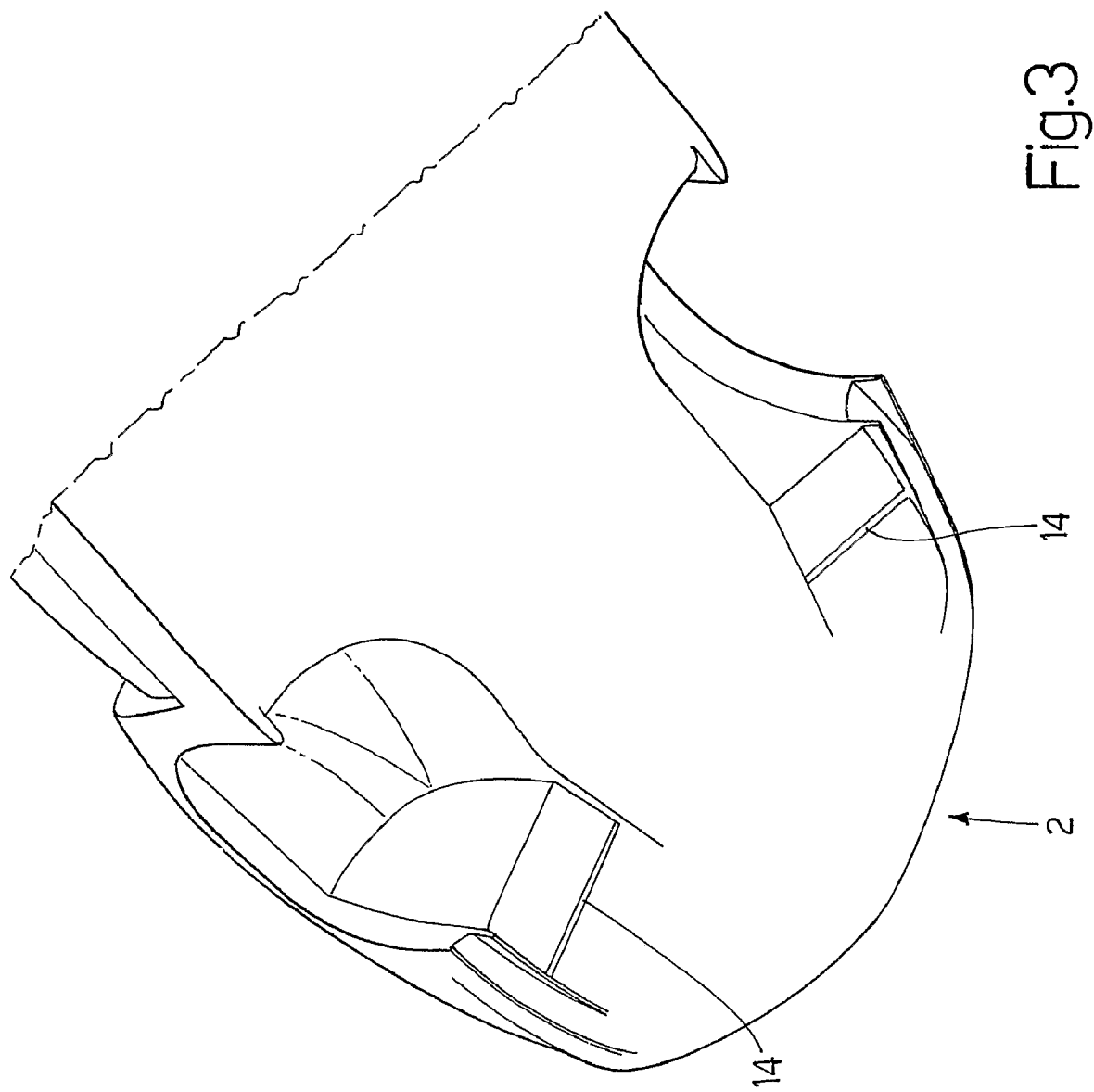
FIG. 3 shows a view in perspective, with parts removed for clarity, of a bottom portion of the FIG. 1 car.

Each cooling duct 10 is connected to a blow duct 13, which originates at an initial portion of cooling duct 10, upstream from front radiator 8, and terminates at a blow opening 14, formed through a bottom portion of car body 2, to direct an air jet which interacts with the airflow about car body 2 to alter the streamline configuration of the car. As shown in FIGS. 2 and 3, each blow opening 14 is formed at the bottom of car body 2, just in front of a front wheel 3, and is oriented longitudinally downwards with respect to car body 2.

As shown in FIG. 2, blow duct 13 has a deflecting device 15, which can be activated to divert part of the air in cooling duct 10 to blow duct 13. More specifically, deflecting device 15 is movable between a rest position (shown by the dash line in FIG. 2) in which deflecting device 15 does not interfere with the airflow along cooling duct 10, and a work position (shown by the continuous line in FIG. 2) in which deflecting device 15 diverts part of the air in cooling duct 10 to blow duct 13. Each deflecting device 15 comprises a movable deflecting member 16 mounted inside cooling duct 10 to divert part of the air in cooling duct 10 to blow duct 13. When deflecting device 15 is set to the rest position, movable deflecting member 16 is housed inside a seat 17, formed along cooling duct 10, so as not to interfere in any way with the airflow along cooling duct 10.

In an embodiment, each deflecting device 15 comprises a movable guard member 18 which, when deflecting device 15 is in the rest position, is embedded seamlessly at the bottom of car body 2, and, when deflecting device 15 is in the work position, projects vertically downwards from the bottom of car body 2, in front of front wheel 3 and just upstream from blow opening 14. Movable guard member 18 and movable deflecting member 16 are hinged to rotate about respective parallel axes of rotation under the control of the same electric actuating device (not shown).

During normal use of car 1, each deflecting device 15 is moved from the rest to the work position when the speed of car 1 exceeds a given threshold, so as to alter the streamline configuration of car body 2. To protect engine 5 at all times, each deflecting device 15 is maintained in the rest position when the temperature of respective front radiator 8 (or of the coolant circulating in front radiator 8) exceeds a given threshold.

Figure 4:
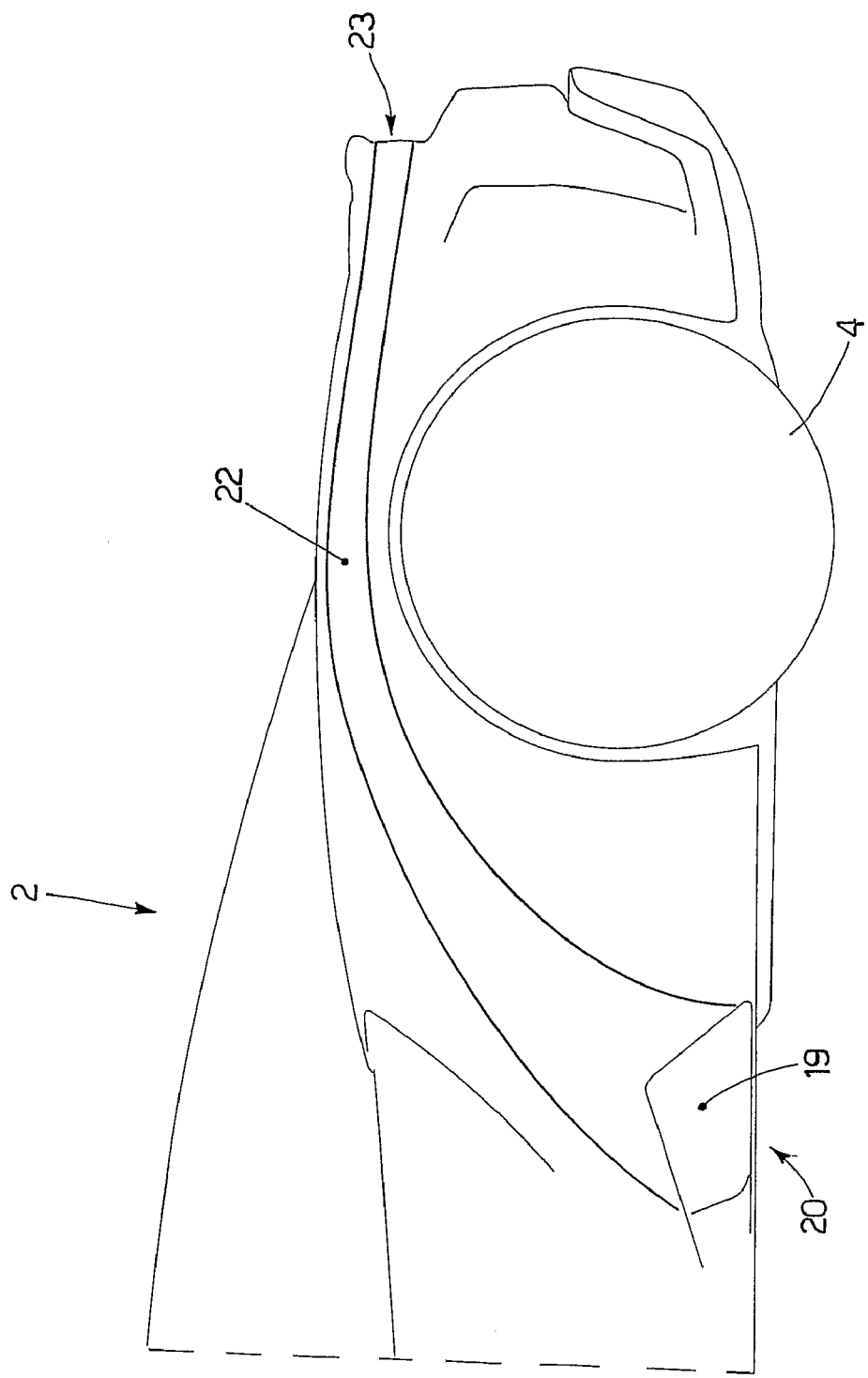
FIG. 4 shows a partly sectioned side view, with parts removed for clarity, of a rear portion of the FIG. 1 car.

As shown in FIG. 4, engine compartment 6 is fitted with two cooling ducts 19 (only one shown in FIG. 4), each of which conducts outside cooling air through engine compartment 6 to cool it. Each cooling duct 19 extends between a substantially vertical inlet opening 20 formed through a bottom portion of a side panel of car body 2, and a substantially horizontal outlet opening 21 (shown in FIGS. 1 and 7) formed through a rear bonnet of car body 2.

Figure 7:
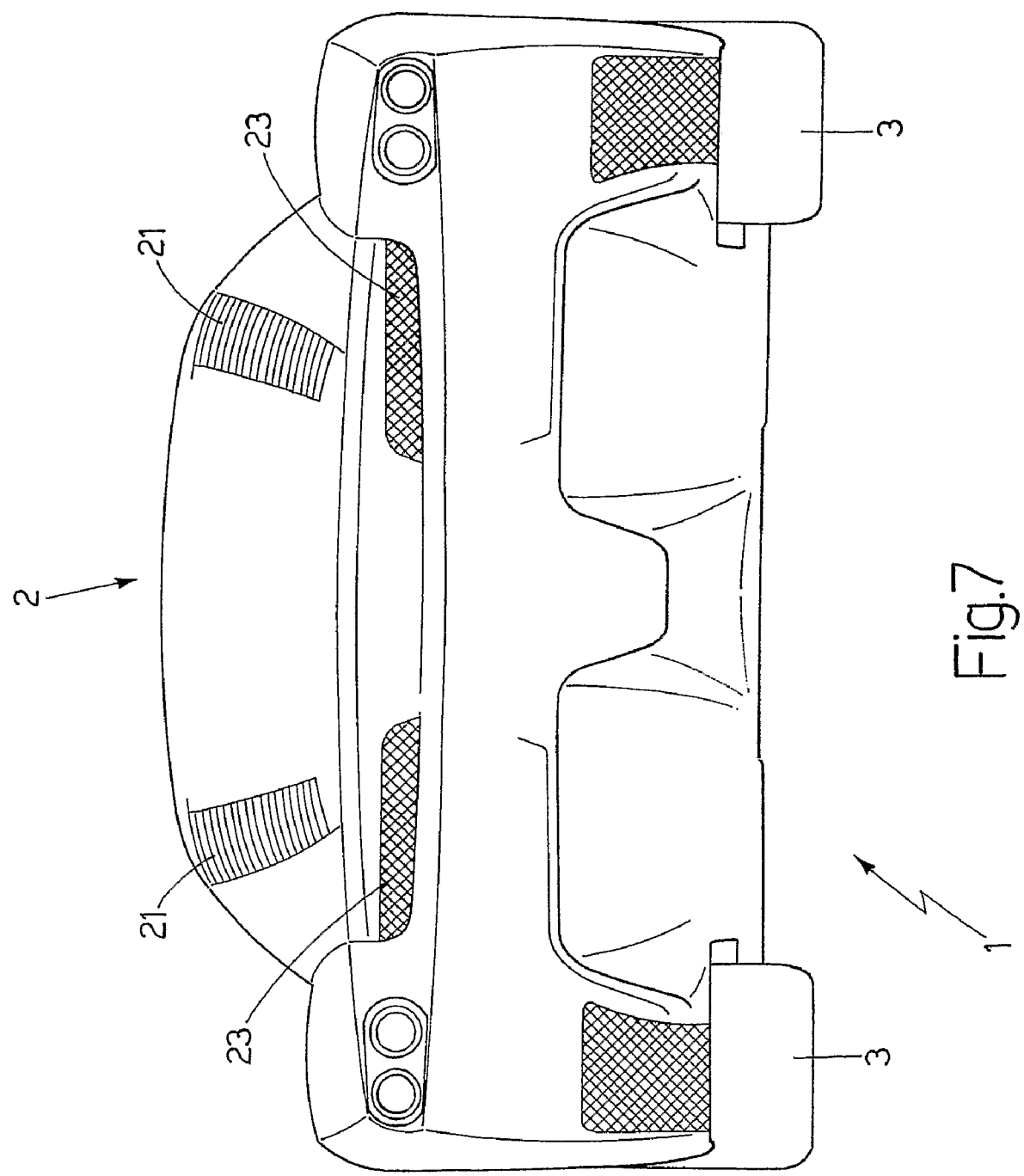
FIG. 7 shows a rear view, with parts removed for clarity, of the FIG. 1 car.

Each cooling duct 19 is connected to a blow duct 22, which originates at an initial portion of cooling duct 19, upstream from engine compartment 6, and terminates at a blow opening 23, formed through a rear portion (in particular, a rear bumper) of car body 2, to direct an air jet which interacts with the airflow about car body 2 to alter the streamline configuration of the car. As shown in FIGS. 4 and 7, each blow opening 23 is formed at the rear of car body 2, and is oriented horizontally and longitudinally with respect to car body 2.

Figure 5:
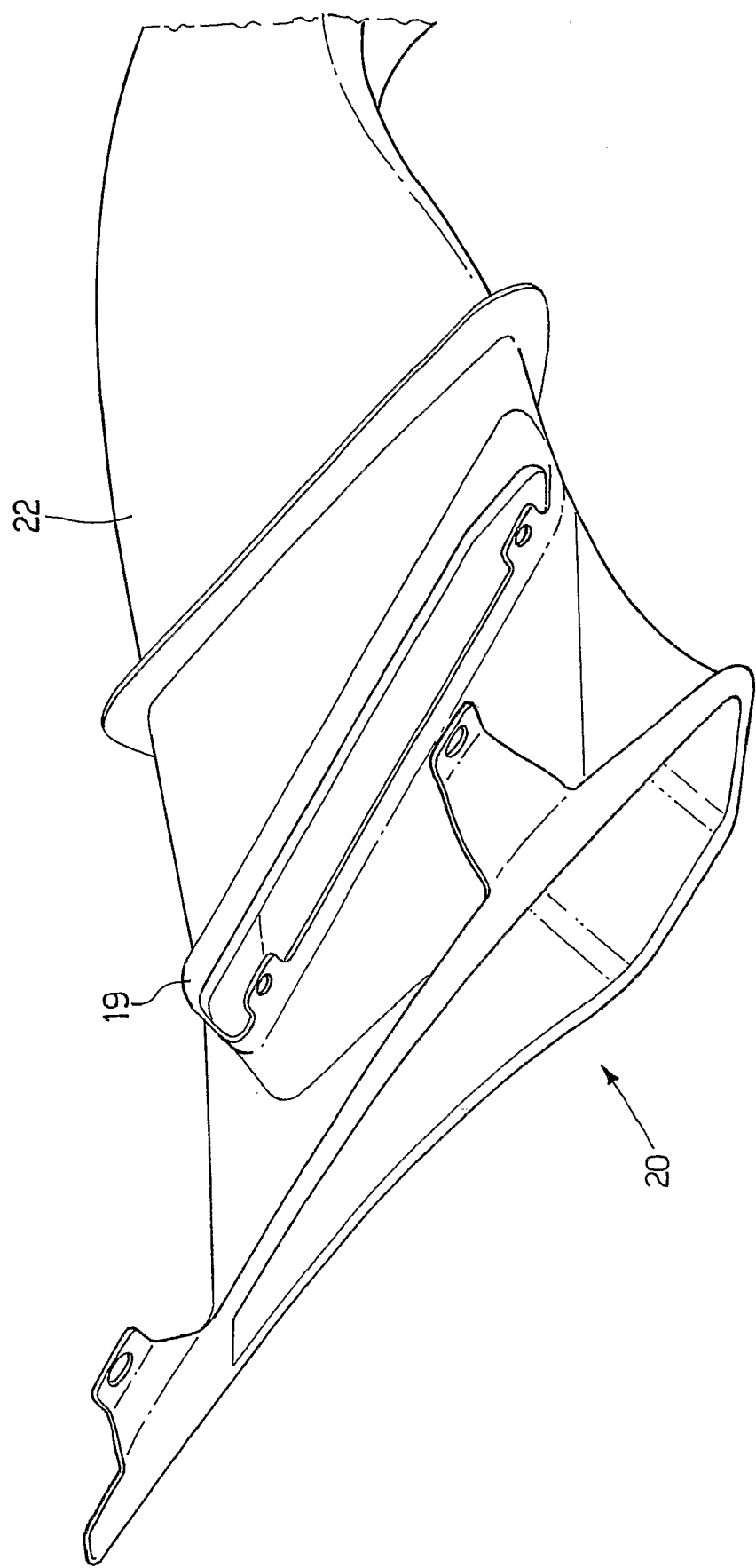
FIG. 5 shows a view in perspective of part of a cooling duct in FIG. 4.
Figure 6:
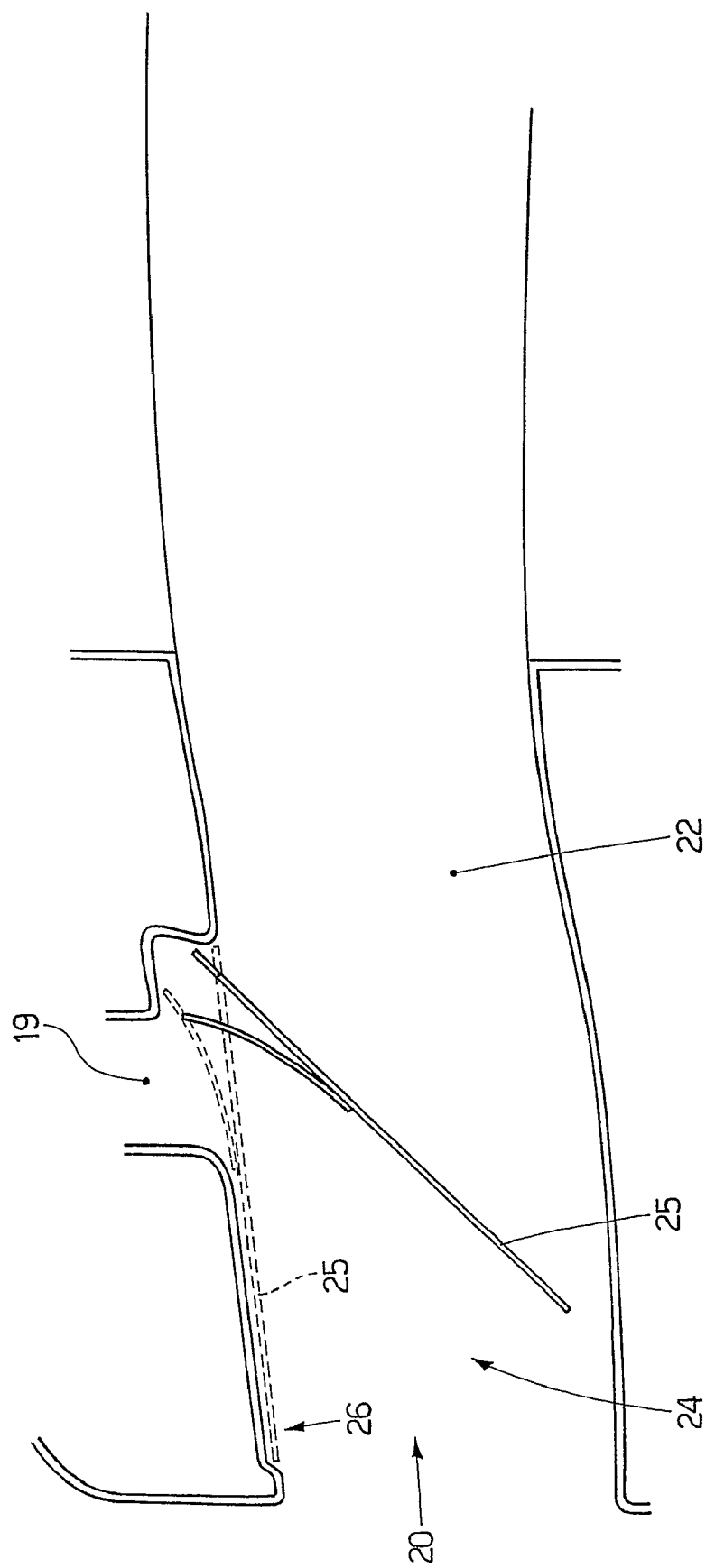
FIG. 6 shows a lateral section, with parts removed for clarity, of the FIG. 5 cooling duct.

As shown in FIGS. 5 and 6, blow duct 22 has a deflecting device 24, which can be activated to divert all the air in cooling duct 19 to blow duct 22. More specifically, deflecting device 24 is movable between a rest position (shown by the continuous line in FIG. 6) in which deflecting device 24 does not interfere with the airflow along cooling duct 19, and a work position (shown by the dash line in FIG. 6) in which deflecting device 24 diverts all the air in cooling duct 19 to blow duct 22. Each deflecting device 24 comprises a movable deflecting member 25 mounted inside cooling duct 19 to divert all the air in cooling duct 19 to blow duct 22. When deflecting device 24 is set to the work position, movable deflecting member 25 is housed inside a seat 26, formed along blow duct 22, so as not to interfere in any way with the airflow along blow duct 22.

During normal use of car 1, each deflecting device 24 is moved from the rest to the work position when the speed of car 1 exceeds a given threshold, so as to alter the streamline configuration of car body 2. To protect engine 5 at all times, each deflecting device 24 is maintained in the rest position when the temperature of engine compartment 6 exceeds a given threshold.

In a further embodiment not shown, deflecting device 15 and/or deflecting device 24 may also be set to one or more intermediate positions between the work position and the rest position.

An advantage of the above embodiment lies in using part of the existing cooling air on car 1 to generate air jets which interact with the airflow about car body 2 to alter the streamline configuration of the car. Research, in fact, shows that, at very high speed, far more cooling air is used than is actually needed for cooling purposes; which means part of the air which would normally be used for cooling may advantageously be used to generate air jets which interact with the airflow about car body 2 to alter the streamline configuration of the car. In other words, at very high speed, air which would normally only be used for cooling is also used to enhance streamlining of the car.

Optimum air-jet performance may thus be achieved with no recourse to external power sources, but by simply controlling the energy of the cooling air at high speed differently and more efficiently.

In an alternative embodiment not shown, a blow duct with a deflecting device of the type described may originate from a brake cooling duct of a front wheel 3 and/or a rear wheel 4.

In an alternative embodiment not shown, a blow duct with a deflecting device of the type described may originate from a cooling duct of a rear radiator 9.

In the case of a cooling duct of engine compartment 6 or a brake cooling duct, the respective deflecting device may divert all the air in the cooling duct to the respective blow duct, seeing as cooling of engine compartment 6 or brake cooling is not normally required at very high speed. Conversely, in the case of a radiator of engine 5, which typically must be cooled at all times, the respective deflecting device may only divert part of the air in the cooling duct to the respective blow duct.

Location of blow openings 14 and 23 as described above is based on CFD (Computational Fluid Dynamics) calculations, which show that, in car 1 as shown in the accompanying drawings, half the drag is generated by the area close to the front fender and by the base. Simulation results show a possible 25% reduction in the drag of car 1 by virtue of blow openings 14 and 23.

More generally speaking, blow openings 14 and 23 and/or other differently located/oriented blow openings may be used to alter the streamline configuration of the car to reduce drag and/or control road-holding and balance of the car.

From the foregoing it will be appreciated that, although specific embodiments of the invention have been described herein for purposes of illustration, various modifications may be made without deviating from the spirit and scope of the invention.

The invention claimed is:
1. A high-performance car comprising:
a car body;
at least one member for cooling;
at least one cooling duct extending between an inlet opening and an outlet opening, both formed through the car body, to conduct outside cooling air through the member for cooling; and
at least one blow duct which terminates at least one blow opening, formed through the car body, to direct an air jet which interacts with the airflow about the car body to alter the streamline configuration of the car;
wherein the blow duct originates at an initial portion of the cooling duct, upstream from the member for cooling, and comprises a deflecting device which can be activated to divert at least part of the air in the cooling duct to the blow duct;
wherein the deflecting device is movable between a rest position, in which the deflecting device does not interfere with the airflow along the cooling duct, and a work position, in which the deflecting device diverts at least part of the air in the cooling duct to the blow duct;
wherein the deflecting device is moved only as a function of the speed of the car and is moved from the rest position to the work position only and always when the speed of the car exceeds a given threshold; and
wherein the member for cooling is a brake of the car.

2. A car as claimed in claim 1, wherein the deflecting device is always maintained in the rest position when the temperature of the member for cooling exceeds a given threshold.

3. A car as claimed in claim 1, wherein the deflecting device diverts all the air in the cooling duct to the blow duct.

4. A car as claimed in claim 1, and comprising two first blow ducts, each terminating at a first blow opening formed at the rear of the car body.

5. A car as claimed in claim 4, wherein each first blow opening is oriented horizontally and longitudinally with respect to the car body.

6. A car as claimed in claim 1, and comprising two second blow ducts, each terminating at a second blow opening formed at the bottom of the car body, just in front of a wheel.

7. A car as claimed in claim 6, wherein each second blow opening is formed at the bottom of the car body, just in front of a front wheel.

8. A car as claimed in claim 6, wherein each second blow opening is oriented longitudinally downwards with respect to the car body.

9. A car as claimed in claim 6, wherein each deflecting device is movable between a rest position, in which the deflecting device does not interfere with the airflow along the cooling duct, and a work position, in which the deflecting device diverts at least part of the air in the cooling duct to the second blow duct; and each deflecting device comprises a movable guard member which, when the deflecting device is in the rest position, is embedded seamlessly at the bottom of the car body, and, when the deflecting device is in the work position, projects vertically downwards from the bottom of the car body, in front of the respective front wheel and just upstream from the respective second blow opening.

10. A car as claimed in claim 9, wherein each deflecting device comprises the movable guard member, and a movable deflecting member which is mounted inside the cooling duct to divert at least part of the air in the cooling duct to the second blow duct; and the movable guard member and the movable deflecting member are hinged to rotate about respective axes of rotation under the control of the same actuating device.

11. A high-performance car comprising:
a car body;
at least one member for cooling;
at least one cooling duct extending between an inlet opening and an outlet opening, both formed through the car body, to conduct outside cooling air through the member for cooling; and
at least one blow duct which terminates at least one blow opening, formed through the car body, to direct an air jet which interacts with the airflow about the car body to alter the streamline configuration of the car;
wherein the blow duct originates at an initial portion of the cooling duct, upstream from the member for cooling, and comprises a deflecting device which can be activated to divert at least part of the air in the cooling duct to the blow duct;
wherein the member for cooling is a brake of the car.

12. A car as claimed in claim 11, wherein the deflecting device diverts all the air in the cooling duct to the blow duct.

13. A high-performance car comprising:
a car body;
at least one member for cooling;
at least one cooling duct extending between an inlet opening and an outlet opening, both formed through the car body, to conduct outside cooling air through the member for cooling; and
at least one blow duct which terminates at least one blow opening, formed through the car body, to direct an air jet which interacts with the airflow about the car body to alter the streamline configuration of the car;
wherein the blow duct originates at an initial portion of the cooling duct, upstream from the member for cooling, and comprises a deflecting device which can be activated to divert at least part of the air in the cooling duct to the blow duct;
wherein the member for cooling is an engine compartment of the car.

14. A car as claimed in claim 13, wherein the deflecting device diverts all the air in the cooling duct to the blow duct.

15. A high-performance car comprising:
a car body;
at least one member for cooling;
at least one cooling duct extending between an inlet opening and an outlet opening, both formed through the car body, to conduct outside cooling air through the member for cooling; and
two blow ducts, each of which terminates at a blow opening formed at the rear of the car body and is formed through the car body to direct an air jet which interacts with the airflow about the car body to alter the streamline configuration of the car;
wherein each blow duct originates at an initial portion of the cooling duct, upstream from the member for cooling, and comprises a deflecting device which can be activated to divert at least part of the air in the cooling duct to the blow duct.

16. A car as claimed in claim 15, wherein each first blow opening is oriented horizontally and longitudinally with respect to the car body.

17. A high-performance car comprising:
a car body;
at least one member for cooling;
at least one cooling duct extending between an inlet opening and an outlet opening, both formed through the car body, to conduct outside cooling air through the member for cooling; and
two blow ducts, each of which terminates at a blow opening formed at the bottom of the car body, just in front of a wheel and is formed through the car body, to direct an air jet which interacts with the airflow about the car body to alter the streamline configuration of the car;
wherein each blow duct originates at an initial portion of the cooling duct, upstream from the member for cooling, and comprises a deflecting device which can be activated to divert at least part of the air in the cooling duct to the blow duct.

18. A car as claimed in claim 17, wherein each blow opening is formed at the bottom of the car body, just in front of a front wheel.

19. A car as claimed in claim 17, wherein each blow opening is oriented longitudinally downwards with respect to the car body.

20. A car as claimed in claim 17, wherein each deflecting device is movable between a rest position, in which the deflecting device does not interfere with the airflow along the cooling duct, and a work position, in which the deflecting device diverts at least part of the air in the cooling duct to the blow duct; and each deflecting device comprises a movable guard member which, when the deflecting device is in the rest position, is embedded seamlessly at the bottom of the car body, and, when the deflecting device is in the work position, projects vertically downwards from the bottom of the car body, in front of the respective front wheel and just upstream from the respective blow opening.

21. A car as claimed in claim 20, wherein each deflecting device comprises the movable guard member, and a movable deflecting member which is mounted inside the cooling duct to divert at least part of the air in the cooling duct to the blow duct; and the movable guard member and the movable deflecting member are hinged to rotate about respective axes of rotation under the control of the same actuating device.

* * * * *